(12) United States Patent
Hughes

(10) Patent No.: US 12,269,759 B1
(45) Date of Patent: Apr. 8, 2025

(54) MIXER FOR ION EXCHANGE WATER SOFTENER

(71) Applicant: Gilles Hughes, Ridley Park, PA (US)

(72) Inventor: Gilles Hughes, Ridley Park, PA (US)

(*) Notice: Subject to any disclaimer, the term of this patent is extended or adjusted under 35 U.S.C. 154(b) by 0 days.

(21) Appl. No.: 18/618,613

(22) Filed: Mar. 27, 2024

(51) Int. Cl.
*C02F 1/42* (2023.01)
*B01J 49/75* (2017.01)

(52) U.S. Cl.
CPC ............ *C02F 1/42* (2013.01); *C02F 2303/16* (2013.01)

(58) Field of Classification Search
CPC ....................................................... C02F 1/42
See application file for complete search history.

(56) References Cited

U.S. PATENT DOCUMENTS

| 4,297,111 | A | * | 10/1981 | Ross | ...................... | B01D 53/18 |
|---|---|---|---|---|---|---|
| | | | | | | 95/220 |
| 6,521,132 | B2 | | 2/2003 | Hughes | | |
| 10,870,590 | B2 | | 12/2020 | Hughes | | |
| 2015/0103617 | A1 | | 4/2015 | Dujardin et al. | | |

\* cited by examiner

*Primary Examiner* — Dirk R Bass
(74) *Attorney, Agent, or Firm* — Sam Pierce

(57) ABSTRACT

According to an aspect of the present invention, there is provided a resin chamber containing an ion-exchange water-softening resin, the resin chamber having an inlet connectable to a source of softenable water under pressure, and the resin chamber having an outlet for discharging softened water, and a mixer for mixing the fluid in the resin chamber, wherein the mixer includes an agitator capable of rotating to agitate the fluid; and a drive for the mixer to cause the agitator to rotate.

1 Claim, 3 Drawing Sheets

MIXER FOR ION EXCHANGE WATER SOFTENER

BACKGROUND

The present inventor's U.S. Pat. No. 6,521,132 discloses an ion-exchange water softener, and particularly discloses a self-regenerating water softener, wherein an ion-exchange resin, after being depleted through use in water softening, is automatically regenerated by the simple act by the user of turning the water on for purposes of use, and turning it off after use. U.S. Pat. No. 6,521,132 further relates to an automatic method for regenerating the resin.

The present inventor's U.S. Pat. No. 10,870,590 also relates to an ion-exchange water softener and further discloses a method for regenerating the resin therein. A self-regenerating ion-exchange water softener comprises a resin chamber containing an ion-exchange water-softening resin. The resin chamber has an inlet connectable to a source of softenable water under pressure. The resin chamber also has an outlet for discharging softened water. A salt chamber is located above the resin chamber and contains a water-soluble regeneration salt capable of forming salt solution for regenerating the resin.

The prior disclosures of the present inventor, however, do not incorporate a mixer capable of agitating the softenable water that provides for distribution throughout the fluid to maintain desirable processing conditions for a self-regenerating ion-exchange water softener capable of regenerating the resin in a resin chamber.

SUMMARY OF INVENTION

Therefore, the present invention provides a mixer integrated with an ion-exchange water softener.

According to an aspect of the present invention, there is provided a resin chamber containing an ion-exchange water-softening resin, the resin chamber having an inlet connectable to a source of softenable water under pressure, and the resin chamber having an outlet for discharging softened water, and a mixer for mixing the fluid in the resin chamber, wherein the mixer includes an agitator capable of rotating to agitate the fluid; and a drive for the mixer to cause the agitator to rotate.

DETAILED DESCRIPTION OF THE DRAWINGS

A water softener according to the resent invention comprises a resin chamber containing an ion-exchange water-softening resin and a mixer a mixer for mixing the fluid in the resin chamber, wherein the mixer includes an agitator capable of rotating to agitate the fluid; and a drive for the mixer to cause the agitator to rotate.

The resin chamber has an inlet connectable to a source of softenable water under pressure. The softenable water may be any water-based fluid for which further conditioning via the resin is desired. The resin chamber includes an outlet for discharging softened water.

The present invention can also include an apparatus for mixing a fluid, comprising: a vessel including at least one sidewall forming an interior compartment for receiving the fluid; a mixer for agitating the fluid in the vessel; and a plurality of connectors for connecting the mixer to at least one sidewall of the vessel such that an axis of rotation of the mixer is not aligned with a vertical axis. The mixer may be fluid-driven, and at least one of the connectors may comprise a conduit for supplying a fluid for driving the mixer.

Figure 1:
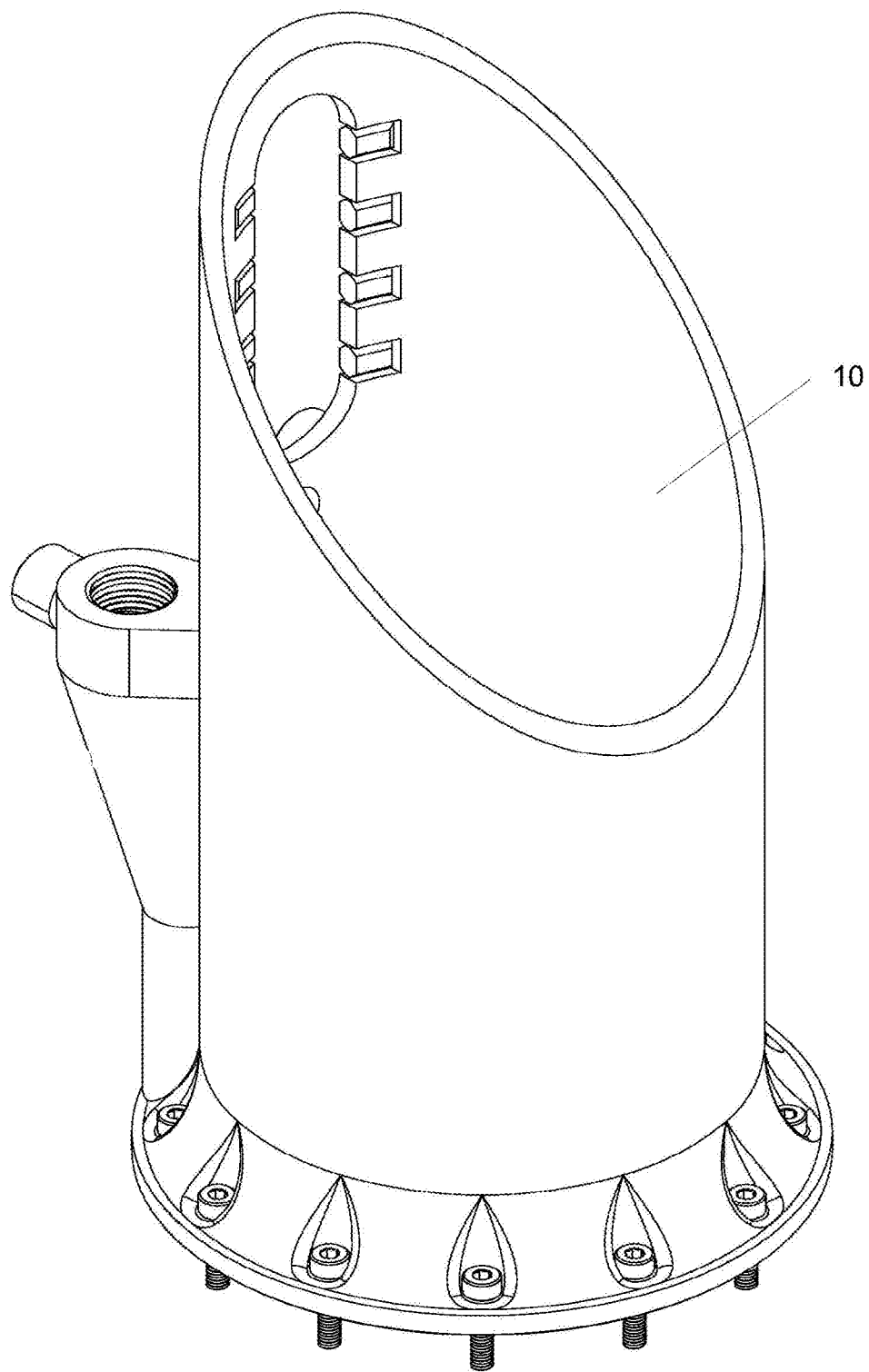
FIG. 1 illustrates a water softening apparatus according to the present invention.
Figure 2:
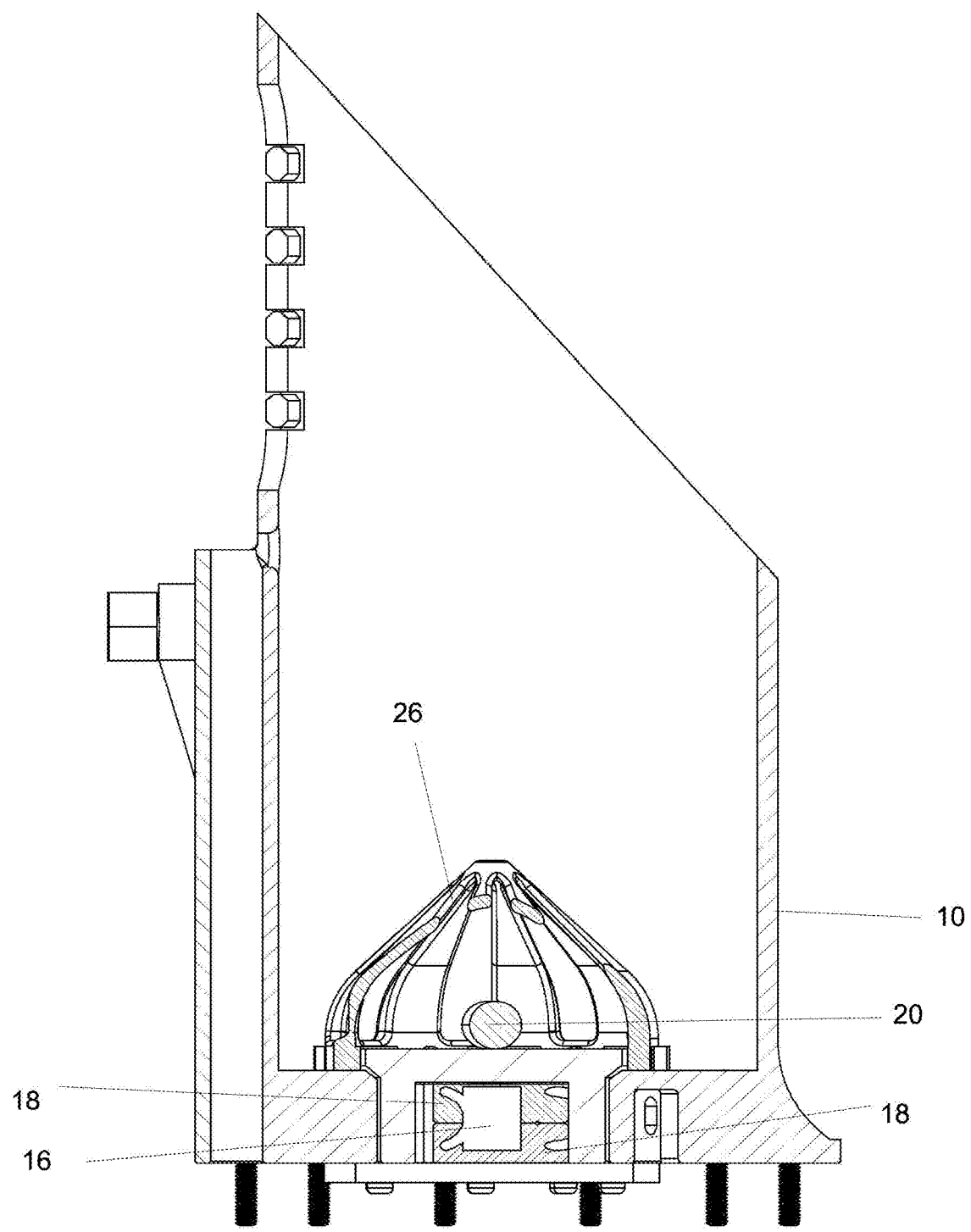
FIG. 2 illustrates a close-up of the mixer of the water softening apparatus according to the present invention.
Figure 3:
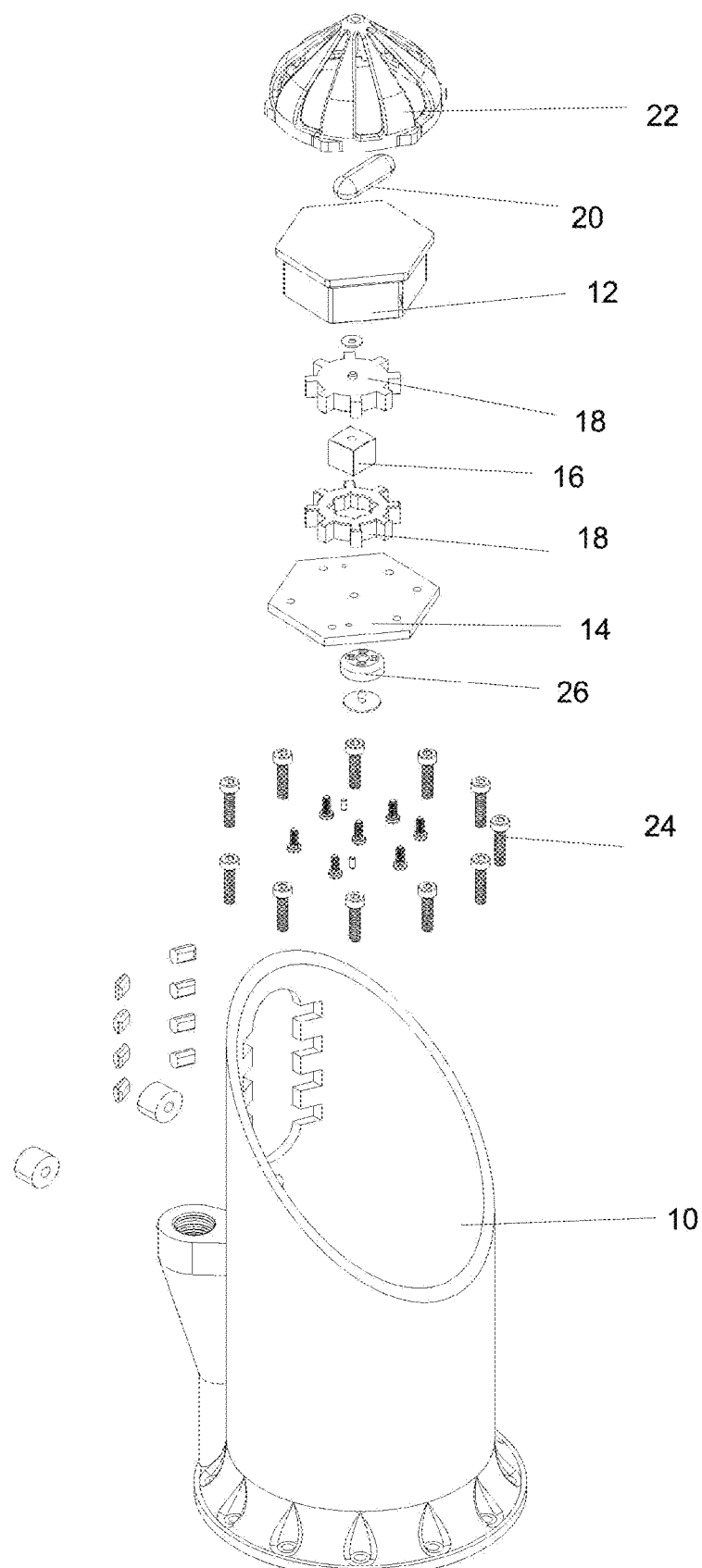
FIG. 3 illustrates an exploded view of the water softening apparatus according to the present invention.

FIG. 1 illustrates a water softening apparatus according to the present invention, FIG. 2 illustrates a close-up of the mixer of the water softening apparatus according to the present invention and FIG. 3 illustrates an exploded view of the water softening apparatus according to the present invention.

The following reference numerals are illustrated in FIG. 1-3: 10—Salt Chamber; 12—Impeller Housing; 14—Impeller housing cover; 16—Magnet; 18—Impeller half (it rotates when water enter impeller housing); 20—Spinner propeller, magnetic (used for mixing the resin with water); and 22—Spinner propeller cover.

A self-regenerating ion-exchange water softener comprises a resin chamber containing an ion-exchange water-softening resin. The resin chamber has an inlet connectable to a source of softenable water under pressure. The resin chamber also has an outlet for discharging softened water. A salt chamber is located above the resin chamber and contains a water-soluble regeneration salt capable of forming salt solution for regenerating the resin. The salt chamber has a high-water mark corresponding to the highest level of fluid normally found in the salt chamber. A chamber connection extends between the salt chamber and the resin chamber and allows a flow of fluid from the salt chamber to the resin chamber. A first normally-open pressure-sensitive valve has an open state and a closed state and is positioned to control flow through the chamber connection. The first pressure-sensitive valve is positioned and configured to sense an increase of water pressure in the resin chamber and to move to the closed state in response thereto. The first pressure-sensitive valve is positioned and configured, when in the open state, to permit a controlled downward gravitational fluid flow from the salt chamber to the resin chamber through the chamber connection. A passageway is in fluid communication with the resin chamber to permit pressurized water to flow upwardly from the resin chamber to a point above the high-water mark of the salt chamber. The passageway has a discharge control for allowing controlled flow of water from the resin chamber to the point above the high-water mark of the salt chamber, to thereby place water in contact with the water-soluble salt in the salt chamber, to generate salt solution for contacting the resin and regenerating the resin.

The water softener disclosed herein may be installed in a built-in plumbing system in a home or factory, or may be a portable system needing only to be connected into a source of softenable water under pressure. chamber are actuated. Various components of the water softener are actuated automatically when the user turns the water on and subsequently turns it off.

An impeller cartridge is used to mix the water for additional softening capability, the spinner/a mixer for mixing the fluid in the salt chamber, and the mixer includes an agitator capable of rotating to agitate the fluid.

The mixer has the impeller and the spinner, in two separate chambers, the spinner is in the salt chamber because it has to mix up the salt, and the impeller which drives it is in the impeller cartridge, cartridge receives liquid from resin chamber which drives the cartridge, then a drive for the mixer to cause the agitator to rotate.

A method of softening water includes the following steps: providing a water including all or a portion of the water softener disclosed herein; connecting a source of softenable water to the inlet of the water softener; initiating a flow of softenable water through the inlet; mixing the softenable water by the mixer of the embodiment of the present invention and receiving softened water from an outlet.

Certain embodiments of the water softener are beneficial to a variety of skin conditions. Embodiments of the water softener may be used in households, restaurants nursing homes, hospitals, apartments, car-washing facilities, hotels and motels, RV's campgrounds, hair salons, and pet-care facilities.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. A self-regenerating ion-exchange water softener comprising:
   a. A salt chamber containing a water-soluble regeneration salt capable of forming a salt solution;
   b. A resin chamber containing an ion-exchange water-softening resin below the salt chamber, wherein the resin chamber has an inlet connectable to a source of softenable water under pressure, and the resin chamber having an outlet for discharging softened water;
   c. A chamber connection extending between the salt chamber and the resin chamber allowing a flow of fluid from the salt chamber to the resin chamber; and
   d. A mixer for mixing fluid at the bottom of the salt chamber, wherein the mixer includes a spinner capable of rotating to agitate the fluid;
      i. Wherein the mixer has an impeller separate from the spinner,
      ii. Wherein the spinner is in the salt chamber and is configured to mix up the salt,
      iii. Wherein the impeller drives the spinner and the impeller has a cartridge being a housing that the impeller resides inside, and
      iv. Wherein the impeller cartridge receives liquid from the resin chamber which drives the impeller to spin the spinner.

* * * * *